United States Patent
Mochizuki et al.

(10) Patent No.: US 10,200,593 B2
(45) Date of Patent: Feb. 5, 2019

(54) IMAGE CAPTURING APPARATUS AND CONTROL METHOD THEREOF

(71) Applicant: CANON KABUSHIKI KAISHA, Tokyo (JP)

(72) Inventors: Toshihiro Mochizuki, Kawasaki (JP); Kazunori Takayama, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/486,879

(22) Filed: Apr. 13, 2017

(65) Prior Publication Data

US 2017/0310878 A1     Oct. 26, 2017

(30) Foreign Application Priority Data

Apr. 22, 2016  (JP) .................................. 2016-086575

(51) Int. Cl.
  *H04N 5/232*   (2006.01)
  *H04N 5/369*   (2011.01)
  *H04N 5/378*   (2011.01)

(52) U.S. Cl.
  CPC ..... *H04N 5/23212* (2013.01); *H04N 5/23235* (2013.01); *H04N 5/3696* (2013.01); *H04N 5/378* (2013.01)

(58) Field of Classification Search
  CPC ... H04N 5/378; H04N 5/23212; H04N 5/3696
  See application file for complete search history.

(56) References Cited

U.S. PATENT DOCUMENTS

| | | | |
|---|---|---|---|
| 8,159,580 B2 | 4/2012 | Suzuki et al. | |
| 8,830,354 B2 | 9/2014 | Nakaoka | |
| 8,983,177 B2 | 3/2015 | Tuzel et al. | |
| 2008/0267601 A1* | 10/2008 | Kobayashi | G03B 13/32 396/91 |
| 2011/0175857 A1* | 7/2011 | Kim | G02B 27/2214 345/204 |
| 2011/0314049 A1* | 12/2011 | Poirier | G06F 17/30241 707/769 |
| 2013/0314510 A1* | 11/2013 | Endo | G03B 35/08 348/49 |
| 2015/0241205 A1 | 8/2015 | Nobayashi | |

FOREIGN PATENT DOCUMENTS

| | | |
|---|---|---|
| JP | 2007-325139 A | 12/2007 |
| JP | 2012-155095 A | 8/2012 |
| JP | 2014-074891 A | 4/2014 |
| JP | 2014-150521 A | 8/2014 |

OTHER PUBLICATIONS

U.S. Appl. No. 15/487,605, filed Apr. 14, 2017 (Takayama et al.).
U.S. Appl. No. 15/486,851, filed Apr. 13, 2017 (Takayama et al.).

* cited by examiner

*Primary Examiner* — Ahmed A Berhan
(74) *Attorney, Agent, or Firm* — Venable LLP

(57) ABSTRACT

An image capturing apparatus having an image sensor, that reads out an image signal from pixels of the image sensor, controls a region in which a plurality of image signals having different viewpoints are read out from pixels of the image sensor, acquires depth information using the image signals read out from the region, and records image information in which the image signals, the depth information and information regarding the region are associated with each other.

14 Claims, 14 Drawing Sheets

FIG. 2

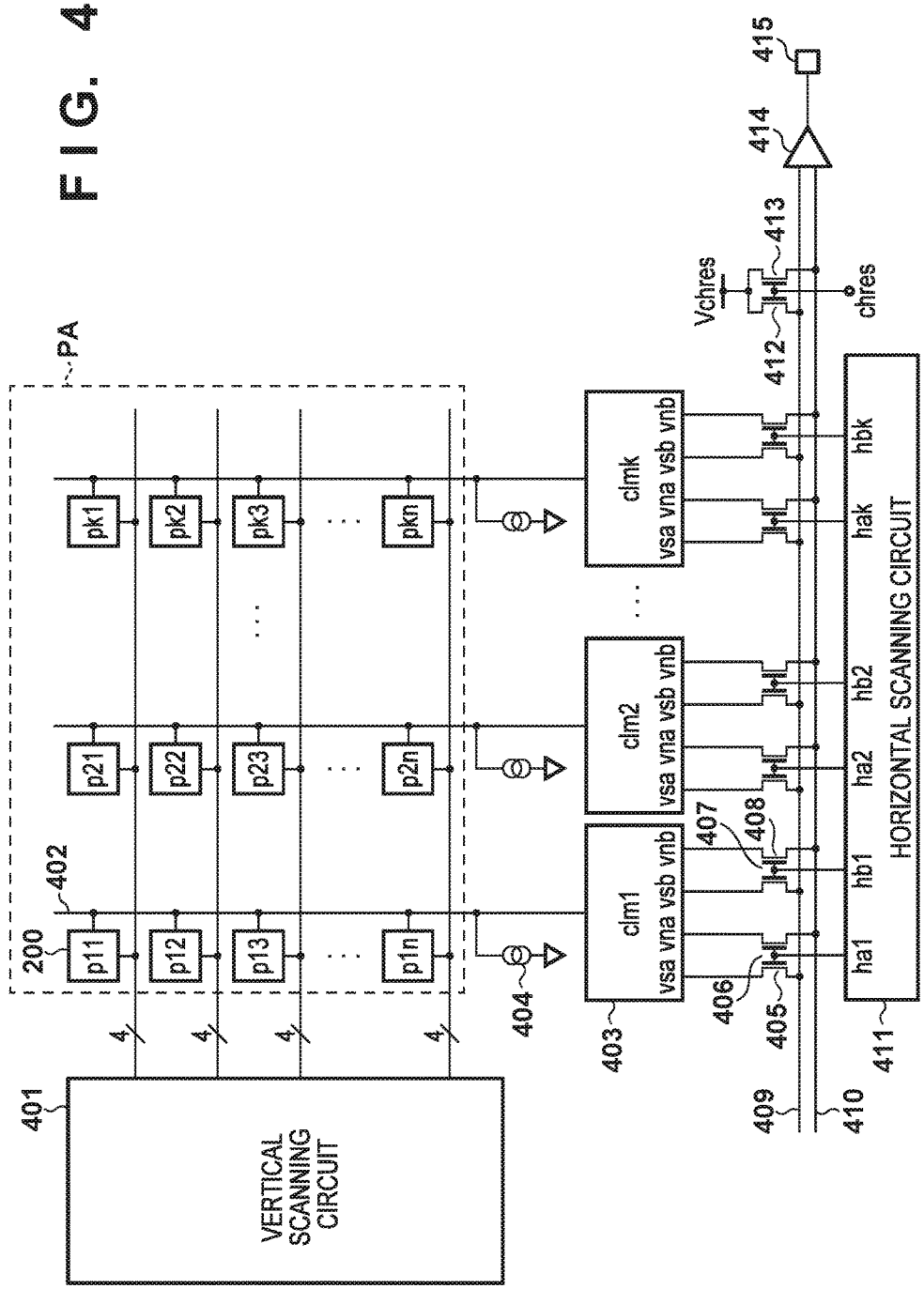

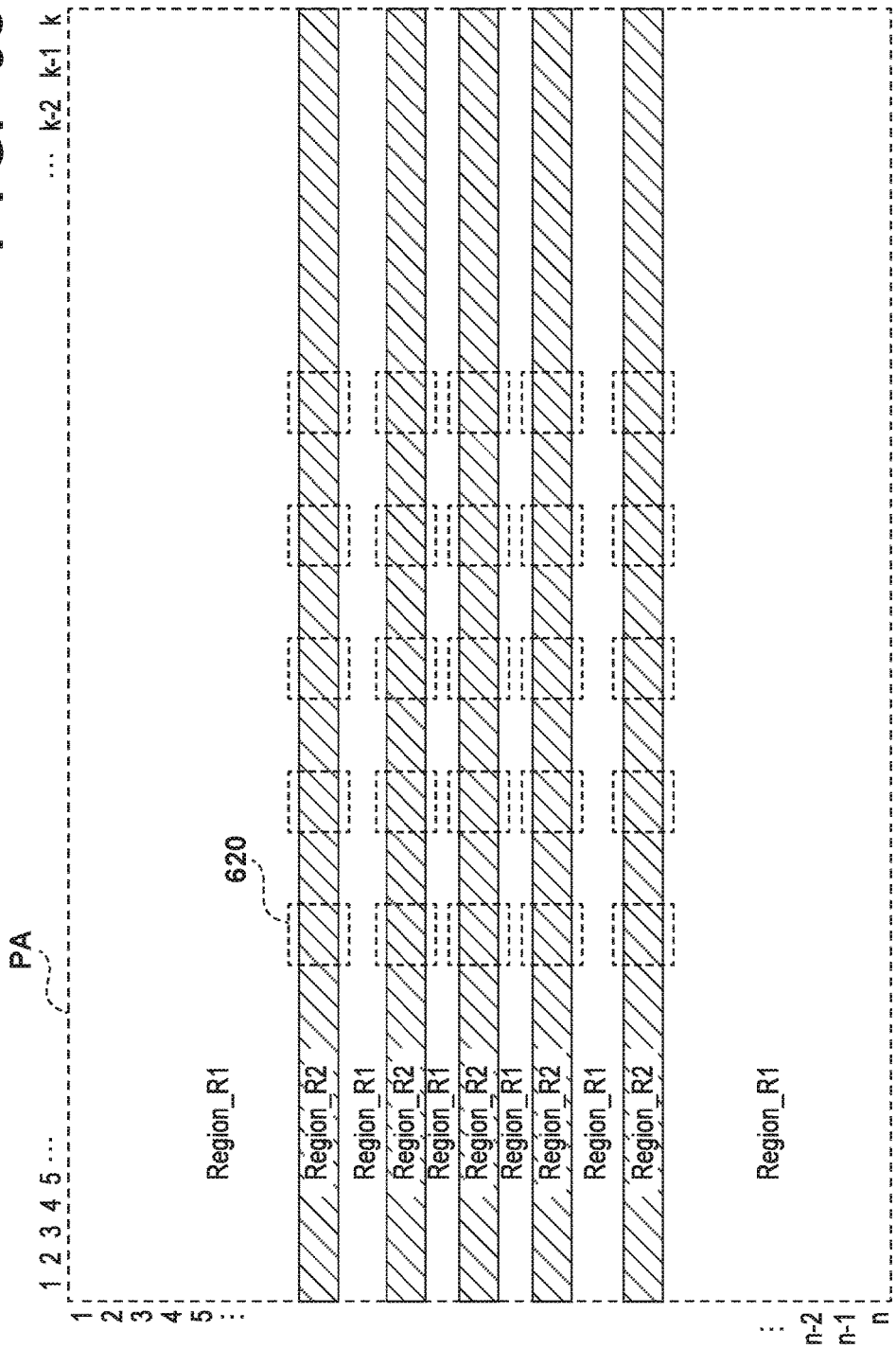

FIG. 10

| d1 | d2 | d3 | d4 | d5 |
|---|---|---|---|---|
| Hd6 | Hd7 | Hd8 | Hd9 | Hd10 |
| d11 | d12 | d13 | d14 | d15 |
| Hd16 | Hd17 | Hd18 | Hd19 | Hd20 |
| d21 | d22 | d23 | d24 | d25 |

IMAGE CAPTURING APPARATUS AND CONTROL METHOD THEREOF

BACKGROUND OF THE INVENTION

Field of the Invention

The present invention relates to an image capturing apparatus and a control method thereof, and in particular relates to a technique for performing focus detection and object tracking using a pair of image signals that are based on light beams that have passed through different pupil regions of an optical system.

Description of the Related Art

Conventionally, techniques for performing focus detection based on the phase difference of image signals acquired by an image sensor that has pupil-divided pixels using a microlens are known (Japanese Patent Laid-Open No. 2007-325139). In Japanese Patent Laid-Open No. 2007-325139, each pupil-divided pixel receives, via the microlens, light beams that have passed through different pupil regions of an imaging optical system. Also, image signals can be acquired by adding together image signals.

In focus detection by a phase difference method as described above, determining the amount of image signals that are to be read out for focus adjustment and subjected to calculation processing is a very important factor in terms of the detection accuracy and the processing speed. In addition, in the case of an image sensor in which each pixel is divided into two, if all the image signals are taken in, the data amount will be twice the data amount of data for a captured image, placing a large load on later-stage processing circuits.

In view of this, image capturing apparatuses have been proposed in which a distance information acquisition region for focus adjustment can be suitably set in the image sensor, and the time for reading out image signals from the image sensor is reduced (Japanese Patent Laid-Open No. 2012-155095). Also, image capturing apparatuses that can generate the distribution of the distances (a distance map) of objects in an image using image signals acquired from a distance information acquisition region for focus adjustment have been proposed (Japanese Patent Laid-Open No. 2014-074891). By using the distance map of Japanese Patent Laid-Open No. 2014-074891, distance information of a main object and another object in the image is acquired, and the main object can be detected in cases such as where the main object and the other object pass each other, and image processing for adjusting white balance for each object can be performed, for example.

However, in the above-described conventional techniques, if thinning of the distance information acquisition region is set in order to reduce the system load and power consumption related to signal processing and the like, the pixel signal readout amount decreases, and there is a possibility that the object detection accuracy deteriorates.

SUMMARY OF THE INVENTION

The present invention has been made in consideration of the aforementioned problems, and realizes a technique that makes it possible to suppress deterioration in object detection accuracy even if the signal readout amount is decreased.

In order to solve the aforementioned problems, the present invention provides an image capturing apparatus comprising: an image sensor; a readout unit configured to read out an image signal from pixels of the image sensor; a readout control unit configured to control a region in which a plurality of image signals having different viewpoints are read out from pixels of the image sensor by the readout unit; an information acquisition unit configured to acquire depth information using the image signals read out from the region by the readout unit; and a recording unit configured to record image information in which the image signals, the depth information and information regarding the region are associated with each other.

In order to solve the aforementioned problems, the present invention provides an image capturing apparatus comprising: an image sensor; a readout unit configured to read out an image signal from pixels of the image sensor; a readout control unit configured to control a region in which a plurality of image signals having different viewpoints are read out from pixels of the image sensor by the readout unit; an information acquisition unit configured to acquire depth information using the image signals read out from the region by the readout unit; and an interpolation unit configured to obtain depth information at the same position in a region that is outside of the region, and in which the image signals are not acquired, by interpolating the depth information acquired by the information acquisition unit.

In order to solve the aforementioned problems, the present invention provides a control method of an image capturing apparatus which has an image sensor, a readout unit configured to read out an image signal from pixels of the image sensor, and a readout control unit configured to control a region in which a plurality of image signals having different viewpoints are read out from pixels of the image sensor by the readout unit, the method comprising: acquiring depth information using the image signals read out from the region by the readout unit; and recording image information in which the image signals, the depth information and information regarding the region are associated with each other.

In order to solve the aforementioned problems, the present invention provides a control method of an image capturing apparatus which has an image sensor, a readout unit configured to read out an image signal from pixels of the image sensor, and a readout control unit configured to control a region in which a plurality of image signals having different viewpoints are read out from pixels of the image sensor by the readout unit, the method comprising: acquiring depth information using the image signals read out from the region by the readout unit; and obtaining depth information at the same position in a region that is outside of the region, and in which the image signals are not acquired, by interpolating the depth information.

In order to solve the aforementioned problems, the present invention provides a computer-readable storage medium storing a program for causing a computer to execute a control method of an image capturing apparatus which has an image sensor, a readout unit configured to read out an image signal from pixels of the image sensor, and a readout control unit configured to control a region in which a plurality of image signals having different viewpoints are read out from pixels of the image sensor by the readout unit, the method comprising: acquiring depth information using the image signals read out from the region by the readout unit; and recording image information in which the image signals, the depth information and information regarding the region are associated with each other.

In order to solve the aforementioned problems, the present invention provides a computer-readable storage medium storing a program for causing a computer to execute a control method of an image capturing apparatus which has an image sensor, a readout unit configured to read out an image signal from pixels of the image sensor, and a readout control unit configured to control a region in which a plurality of image signals having different viewpoints are read out from pixels of the image sensor by the readout unit, the method comprising: acquiring depth information using the image signals read out from the region by the readout unit; and obtaining depth information at the same position in a region that is outside of the region, and in which the image signals are not acquired, by interpolating the depth information.

According to the present invention, it is possible to suppress deterioration in object detection accuracy even if the signal readout amount is decreased.

Further features of the present invention will become apparent from the following description of exemplary embodiments (with reference to the attached drawings).

BRIEF DESCRIPTION OF THE DRAWINGS

FIG. 2 is a diagram schematically showing the pixel arrangement of an image sensor of the embodiments.

FIG. 4 is a configuration diagram of the image sensor of the embodiments.

FIG. 5C is a diagram showing a focus detection frame that is set for the pixel array of the image sensor of the embodiments.

FIG. 10 is a concept diagram illustrating phase difference after phase interpolation.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

DESCRIPTION OF BACKGROUND

First, the background of the embodiments will be specifically described with reference to FIGS. 13A to 13C.

Figure 13A:
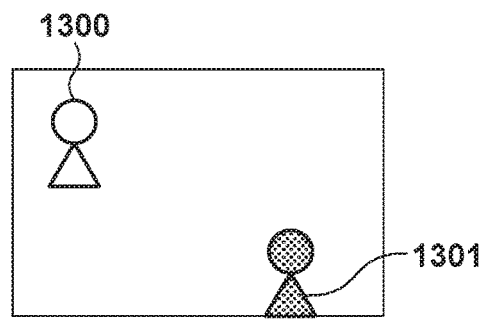
FIGS. 13A to 13D are diagrams illustrating the background of the embodiments.
Figure 13B:
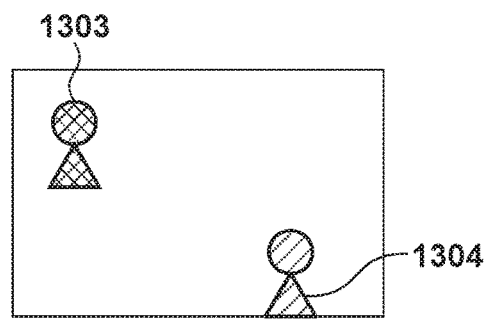
Figure 13C:
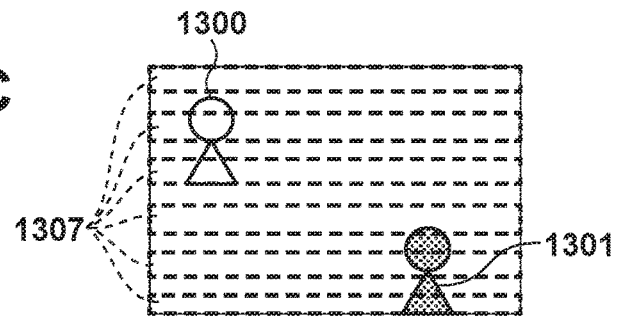

FIGS. 13A to 13C illustrate a distance information acquisition region and a distance map thereof that are arbitrarily set on an imaging screen at the time of AF control during image shooting, and are required for focus adjustment and object detection (distance map data generation).

FIG. 13A illustrates image signals in the case where a distance information acquisition region is set over the entirety of an imaging screen. In FIG. 13A, reference numeral 1300 denotes a main object, reference numeral 1301 denotes an object other than the main object, and reference numeral 1302 denotes a distance information acquisition region.

FIG. 13B illustrates a distance map acquired from the distance information acquisition region 1302 in FIG. 13A. Reference numeral 1303 denotes a distance of the main object 1300, and reference numeral 1304 denotes a distance of the object 1301 other than the main object.

FIG. 13C illustrates a distance information acquisition region set such that discrete thinning is performed on the imaging screen in order to reduce the system load and power consumption. In FIG. 13C, the state of the surroundings of the main object needs to be determined in order to detect the main object 1300 using distance information. Therefore, a distance information acquisition region needs to be set such that the entire screen can be viewed. Therefore, as illustrated, distance information acquisition regions 1307 are discretely set over the entire screen.

Figure 13D:
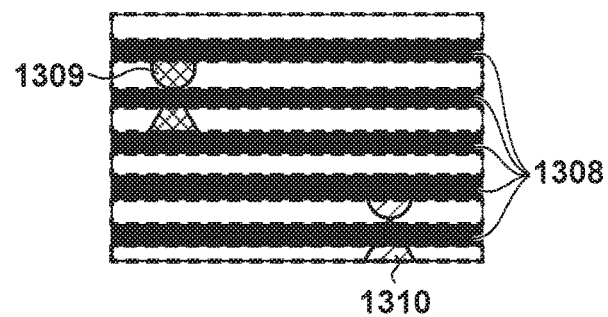

FIG. 13D illustrates a distance map acquired from the distance information acquisition regions 1307 in FIG. 13C. Solid black portions 1308 are outside of the distance information acquisition regions, indicating that distance information cannot be acquired in these portions. A distance 1309 of the main object 1300 and a distance 1310 of the object 1301 other than the main object can only be acquired discretely. In this case, the signal readout amount of the pixels decreases by an amount corresponding to the regions 1308 outside of the distance information acquisition regions, and thus there is a possibility that the object detection accuracy deteriorates.

Accordingly, in the following embodiments, it is made possible to suppress deterioration in object detection accuracy even if a distance information acquisition region is set such that discrete thinning is performed.

First Embodiment

In this embodiment, an example will be described in which an image capturing apparatus is realized by a digital video camera that has an autofocus (AF) function by a phase difference detection method and an object detection function (a main object tracking function), but the present invention can be applied to electronic devices such as smart phones, which are one type of a mobile phone, and tablet terminals.

Apparatus Configuration

The configuration of an image capturing apparatus 100 of this embodiment will be described below with reference to FIG. 1.

Figure 1:
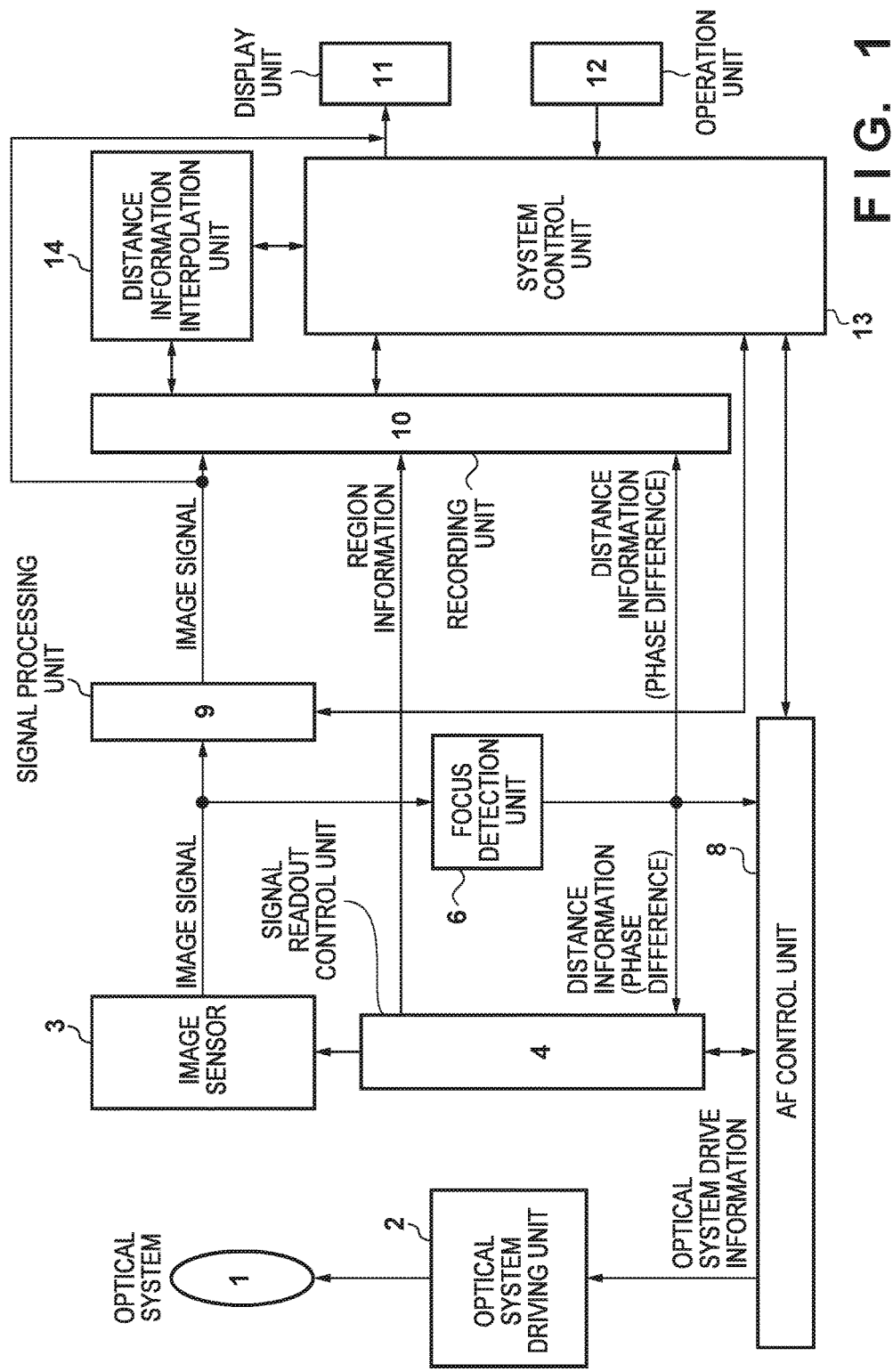
FIG. 1 is a block diagram showing the configuration of an image capturing apparatus of embodiments of the present invention.

In FIG. 1, an optical system 1 includes a zoom lens, a focus lens and a diaphragm. An optical system driving unit 2 controls the optical system 1 based on optical system drive information that is output from an AF control unit 8 to be described later. An image sensor 3 is provided with photoelectric conversion elements of a CMOS or the like, and converts an object image formed on a light receiving surface by the optical system 1 into electrical signals, and outputs image signals.

A signal readout control unit 4 controls image signal readout by driving the image sensor 3 based on object distance information from a focus detection unit 6, which will be described later, under control of the AF control unit 8. The signal readout control unit 4 also outputs, to a recording unit 10, information regarding an object distance information acquisition region when reading out image signals from the image sensor 3 (hereinafter, region information). Note that the image sensor 3 of this embodiment has a plurality of pixel portions that each receive a light beam that has passed through a different pupil region of the optical system 1, and output pupil-divided image signals. Image signals (an A image signal and a B image signal) having different parallax (or viewpoints) can be individually read out from each pupil-divided pixel by a drive pulse from the signal readout control unit 4. The circuit configuration of the image sensor 3 will be described later with reference to FIGS. 2 to 6.

The focus detection unit 6 calculates distance information (depth information and distance map data) used for AF control and object detection based on the image signals (the A image signal and the B image signal) from the image sensor 3, and outputs the distance information to the signal readout control unit 4, the AF control unit 8 and the recording unit 10.

The AF control unit 8 performs phase difference AF control under control of a system control unit 13. The AF control unit 8 acquires distance information from the focus detection unit 6, and outputs control signals to the optical system driving unit 2.

A signal processing unit 9 generates image signals acquired by adding together image signals from the image sensor 3, performs predetermined signal processing, and outputs image signals for display or for recording. The signal processing unit 9 also performs image processing such as color conversion, white balance correction and gamma correction, resolution conversion processing, image compression conversion and the like on the generated image signals, and outputs, to a recording unit 10 and a display unit 11, image signals for display or for recording.

The recording unit 10 is a memory card, a hard disk or the like in which the image signals generated by the signal processing unit 9 are recorded, and from which images that have been already recorded are read out. The recording unit 10 also records image information in which image signals processed by the signal processing unit 9, region information from the signal readout control unit 4, and distance information from the focus detection unit 6 are associated with each other.

A distance information interpolation unit 14 interpolates distance information for a thinned region that is a region other than a distance information acquisition region, based on image information recorded in the recording unit 10. Note that detailed processing of the distance information interpolation unit 14 will be described later.

The display unit 11 is a liquid crystal panel (LCD) or the like that displays images generated by the signal processing unit 9, various menu screens and the like. An operation unit 12 is constituted by various switches (e.g., AF on/off and zoom) for receiving a user operation, and transmits instructions from the user to the system control unit 13.

The system control unit 13 includes a CPU, a RAM and a ROM for integrally controlling various functions of the image capturing apparatus 100, a dedicated circuit and the like. The CPU executes a control sequence, which will be described later, by loading, to the RAM serving as a work memory, a program stored in the ROM that is a non-volatile memory, and executing the program.

Configuration of Image Sensor

Figure 2:
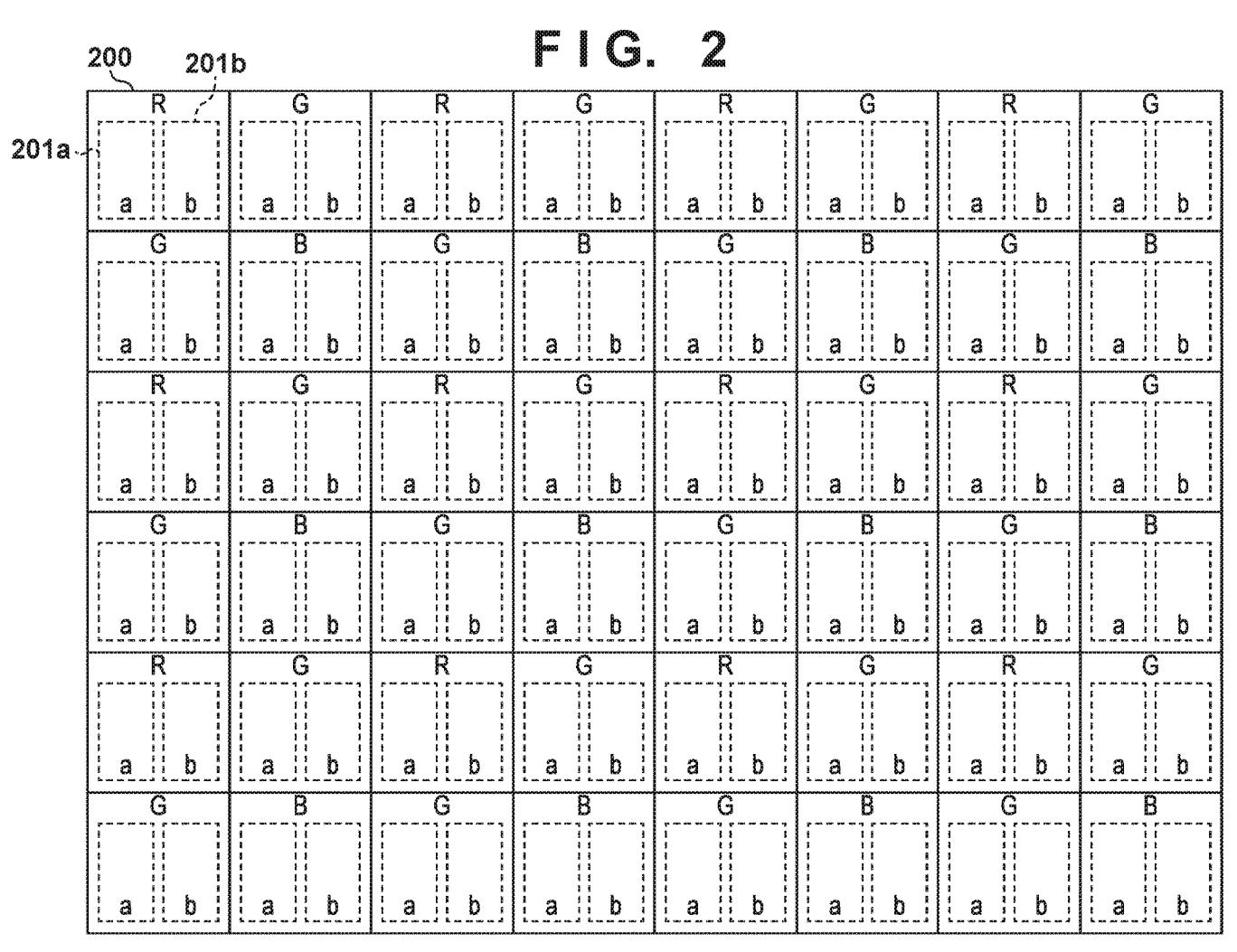

FIG. 2 is a schematic diagram showing the pixel arrangement of the image sensor 3. Unit pixels 200 are arranged in a matrix, and R (Red)/G (Green)/B (Blue) color filters are arranged on the unit pixels 200 in a Bayer pattern. In addition, subpixels a and b are arranged in each of the unit pixels 200, and photodiodes (hereinafter, PDs) 201a and 201b are respectively arranged in the subpixels a and b. Imaging signals that are output from the subpixels a and b are used for focus detection, and an a/b composite signal that is a signal acquired by adding the imaging signals output from the subpixel a and the subpixel b is used for image generation.

Figure 3:
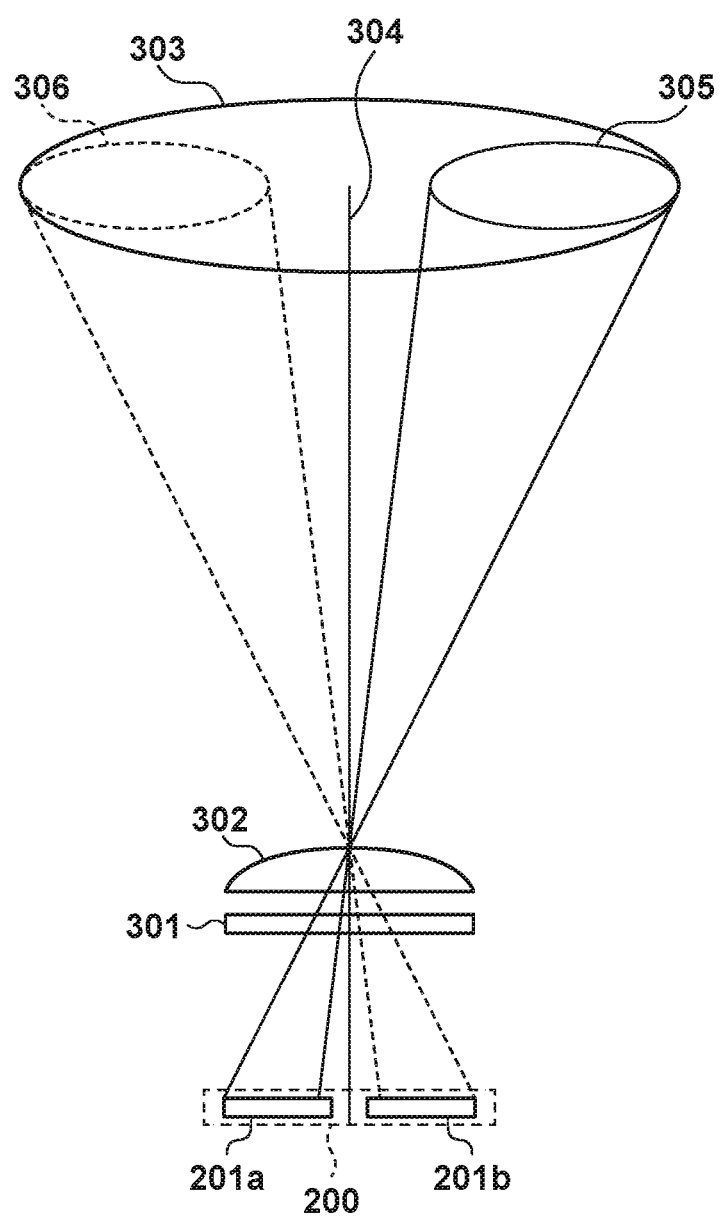
FIG. 3 is a diagram schematically showing the relationship between light beams coming from an exit pupil of a photographing lens and a pixel.

FIG. 3 shows the relationship between light beams coming from different regions of the exit pupil of the optical system 1 and the unit pixel 200, and the same reference numerals are assigned to constituent elements similar to those in FIG. 2.

As shown in FIG. 3, a color filter 301 and a microlens 302 are formed on each of the unit pixels 200. Specifically, the PDs 201a and 201b in the unit pixel 200 are assigned to one microlens 302. Light that has passed through an exit pupil 303 of the lens enters the unit pixel 200 centered on an optical axis 304. A light beam that passes through a pupil region 305, which is a region constituting a portion of the exit pupil 303, passes through the microlens 302, and is received by the subpixel a. On the other hand, a light beam that passes through a pupil region 306, which is a region constituting another portion of the exit pupil 303, passes through the microlens 302, and is received by the subpixel b. Therefore, the subpixels a and b respectively receive light from the separate pupil regions 305 and 306 of the exit pupil 303 of the optical system 1. Therefore, phase difference (imaging plane) focus detection is made possible by comparing an output signal of the subpixel a (A image signal) with an output signal of the subpixel b (B image signal) that have different parallax (or viewpoints) as described above.

Figure 5A:
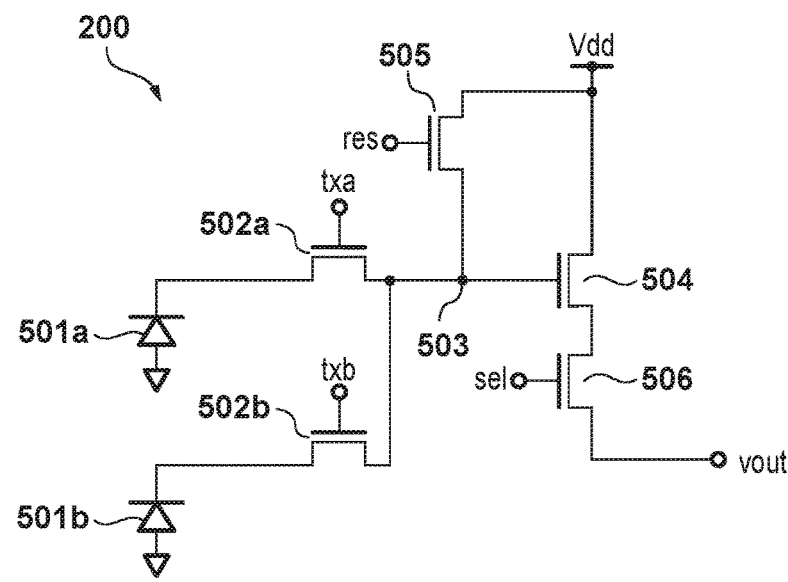
FIG. 5A is a diagram showing the circuit configuration of a unit pixel of the image sensor of the embodiments.

FIG. 4 shows the circuit configuration of the image sensor 3. In a pixel region PA, the unit pixels 200 are arranged in a matrix (n rows×k columns) as indicated by p11 to pkn. Here, the configuration of the unit pixel 200 will be described with reference to FIG. 5A. FIG. 5A is a diagram showing the circuit configuration of a unit pixel of the image sensor.

In FIG. 5A, optical signals that have entered PDs (photoelectric conversion portion) 501a and 501b of the above-described subpixels a and b undergo photoelectric conversion performed by the PDs 501a and 501b, and electric charges that correspond to an exposure amount are accumulated in the PDs 501a and 501b. The electric charges accumulated in the PDs 501a and 501b are transferred to an FD (floating diffusion) portion 503 (electric charge transfer) by raising signals txa and txb that are respectively applied to the gates of transfer gates 502a and 502b to the high level. The FD portion 503 is connected to the gate of a floating diffusion amplifier 504 (hereinafter, expressed as an FD amplifier), and the amount of electric charges transferred from the PDs 501a and 501b is converted into a voltage amount by the FD amplifier 504.

The FD portion 503 is reset by raising, to the high level, a signal res that is applied to the gate of an FD reset switch 505 for resetting the FD portion 503. In addition, in the case of resetting the electric charges of the PDs 501a and 501b, the signal res as well as the signals txa and txb are raised to the high level at the same time. This turns on both the transfer gates 502a and 502b and the FD reset switch 505, and the PDs 501a and 501b are reset via the FD portion 503. A pixel signal that has been converted into a voltage by the FD amplifier 504 is output to an output vout of the unit pixel 200 by raising a signal sel that is applied to the gate of a pixel selection switch 506 to the high level.

As shown in FIG. 4, a vertical scanning circuit 401 supplies, to each of the unit pixels 200, driving signals such as res, txa, txb and sel for controlling the above-described switches of the unit pixel 200. These driving signals res, txa, txb and sel are common to each row. The outputs vout of the unit pixels 200 are connected to a column common readout circuit 403 via a vertical output line 402 for each column.

Here, the configuration of the column common readout circuit 403 will be described with reference to FIG. 5B.

The vertical output line 402 is provided for each column of unit pixels 200, and is connected to the outputs vout of the unit pixels 200 for one column. A current source 404 is connected to the vertical output line 402, and a source follower circuit is constituted by the current source 404 and the FD amplifiers 504 of the unit pixels 200 connected to the vertical output line 402.

Figure 5B:
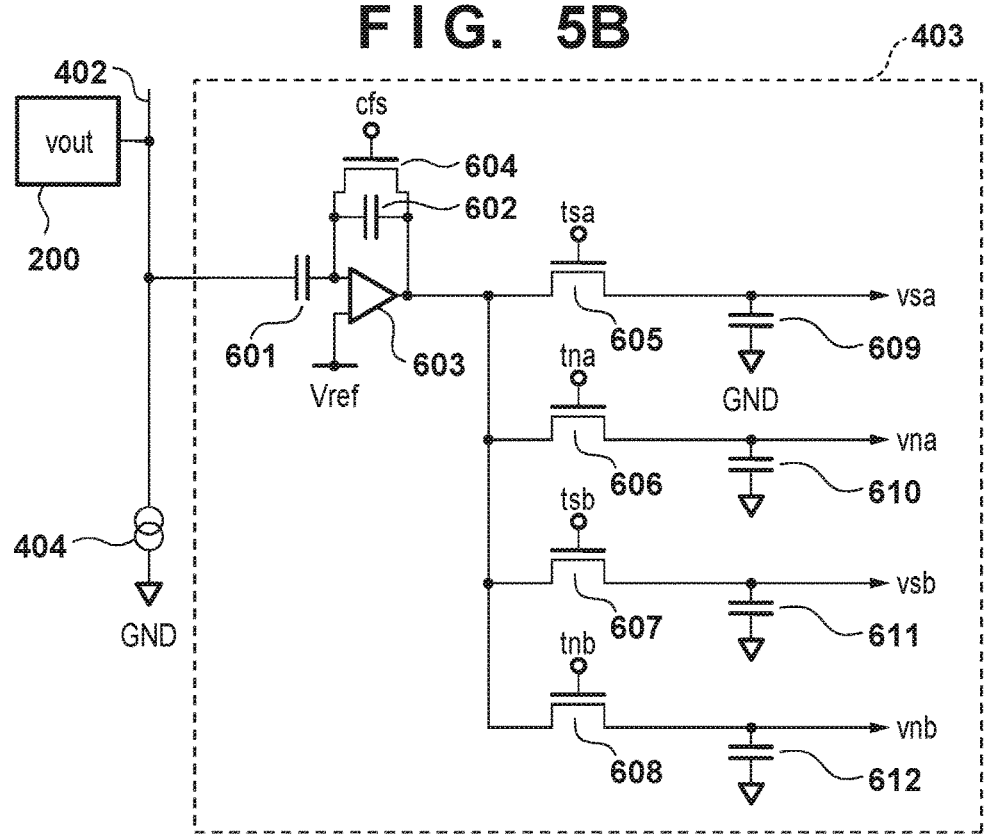
FIG. 5B is a configuration diagram of a readout circuit for a column of unit pixels of the image sensor of the embodiments.

In FIG. 5B, a clamp capacitor 601 has a capacity of C1, a feedback capacitor 602 has a capacity of C2, and an operational amplifier 603 has a non-inverted input terminal connected to a reference power supply Vref. A switch 604 is used for causing two ends of the feedback capacitor 602 to short-circuit, and the switch 604 is controlled by a signal cfs.

Transfer switches 605 to 608 are used for respectively transferring, to signal storage capacitors 609 to 612, signals read out from the unit pixels 200. The first S signal storage capacitor 609 stores a pixel signal Sa that is output from the subpixel a by a readout operation to be described later. Also, the second S signal storage capacitor 611 stores an a/b composite signal Sab that is a signal acquired by compositing (adding) a signal output from the subpixel a and a signal output from the subpixel b. Moreover, the first N signal storage capacitor 610 and the second N signal storage capacitor 612 respectively store noise signals N of the unit pixels 200. The signal storage capacitors 609 to 612 are respectively connected to outputs vsa, vna, vsb and vnb of the column common readout circuit 403.

Horizontal transfer switches 405 and 406 are respectively connected to the outputs vsa and vna of the column common readout circuit 403. The horizontal transfer switches 405 and 406 are controlled by an output signal ha* (* is a column number) of a horizontal scanning circuit 411.

Also, horizontal transfer switches 407 and 408 are respectively connected to the outputs vsb and vnb of the column common readout circuit 403. The horizontal transfer switches 407 and 408 are controlled by an output signal hb* (* is a column number) of the horizontal scanning circuit 411. Horizontal output lines 409 and 410 are connected to an input of a differential amplifier 414, and the differential amplifier 414 takes the difference between an S signal and an N signal, applies a predetermined gain at the same time, and outputs a final output signal to an output terminal 415.

When a signal chres applied to the gates of horizontal output line reset switches 412 and 413 is raised to the high level, the horizontal output line reset switches 412 and 413 are turned on, and the horizontal output lines 409 and 410 are reset to a reset voltage Vchres.

An operation of reading out A image signals and an operation of reading out A+B image signals that are composite signals of the A image signals and B image signals will be described below.

FIG. 5C shows the relationship between distance information acquisition regions for focus adjustment and distance information acquisition regions for object detection that are set in the pixel region PA of the image sensor 3. Focus detection frames 620 are set by the focus detection unit 6, using region information from the AF control unit 8.

In the pixel region PA constituted by pixels of k columns×n rows, regions indicated by dotted lines are the focus detection frames 620. A image signals and A+B image signals are read out from unit pixel rows (pixel lines) included in distance information acquisition regions R1 indicated by hatched portions, and are used for image generation, focus detection and object detection. Only addition signals of A image signals and B image signals are read out from unit pixel rows (pixel lines) included in regions R2 other than the distance information acquisition regions R1, and are used only for image generation.

Note that as shown in FIG. 5C, if a plurality of regions R1 are set in the vertical direction of the pixel region, the number of rows of the unit pixels 200 may be set differently in each of the regions R1.

Figure 6A:
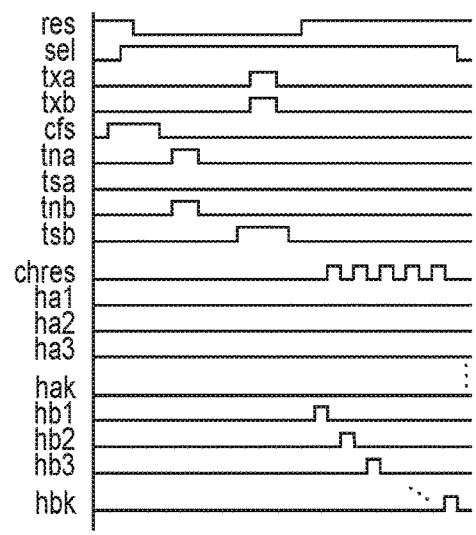
FIGS. 6A to 6C are timing charts of an operation of reading out a row of unit pixels of the image sensor of the embodiments.

Next, a readout operation of the image sensor 3 will be described with reference to FIG. 6A. FIG. 6A is a timing chart of the above-described readout operation performed on each row of the above-described regions R2.

First, the operational amplifier 603 is brought into a buffer state by raising the signal cfs to the high level and turning on the switch 604. Next, the signal sel is raised to the high level, and the pixel selection switch 506 of a unit pixel is turned on. After that, the signal res is lowered to the low level, and the FD reset switch 505 is turned off so as to release the resetting of the FD portion 503.

Subsequently, after the signal cfs is returned to the low level and the switch 604 is turned off, signals tna and tnb are raised to the high level, and noise signals N are stored in the first N signal storage capacitor 610 and the second N signal storage capacitor 612 via transfer switches 606 and 608.

Next, the signals tna and tnb are lowered to the low level, and the transfer switches 606 and 608 are turned off. After that, a transfer switch 607 is turned on by raising a signal tsb to the high level, and the transfer gates 502a and 502b are turned on by raising the signals txa and txb to the high level. By this operation, signals acquired by compositing electric charge signals accumulated in the PDs 501a of the subpixels a and electric charge signals accumulated in the PDs 501b of the subpixels b are output to the vertical output line 402 via the FD amplifier 504 and the pixel selection switch 506. Signals of the vertical output line 402 are amplified by the operational amplifier 603 using a gain that corresponds to the capacity ratio of the capacity C1 of the clamp capacitor 601 to the capacity C2 of the feedback capacitor 602, and are stored in the second S signal storage capacitor 611 via the transfer switch 607 (the a/b composite signal Sab). After sequentially turning off the transfer gates 502a and 502b and the transfer switch 607, the signal res is raised to the high level so as to turn on the FD reset switch 505, and the FD portion 503 is reset.

Next, the horizontal transfer switches 407 and 408 are turned on due to an output hb1 of the horizontal scanning circuit 411 rising to the high level. Accordingly, signals of the second S signal storage capacitor 611 and the second N signal storage capacitor 612 are output to the output terminal 415 via the horizontal output lines 409 and 410 and the differential amplifier 414. The horizontal scanning circuit 411 outputs the a/b composite signals (the A+B image signals) for one row by sequentially raising selection signals hb1, hb2, . . . , hbk of each column to the high level. Note that while signals of each column are read out by the signals hb1 to hbk, the horizontal output line reset switches 412 and 413 are turned on by raising the signal chres to the high level, and the horizontal output lines 409 and 410 are reset to the level of the reset voltage Vchres once.

The above-described operation is an operation of reading out each row of unit pixels in the region R2. The A+B image signals are read out by this operation.

Figure 6B:
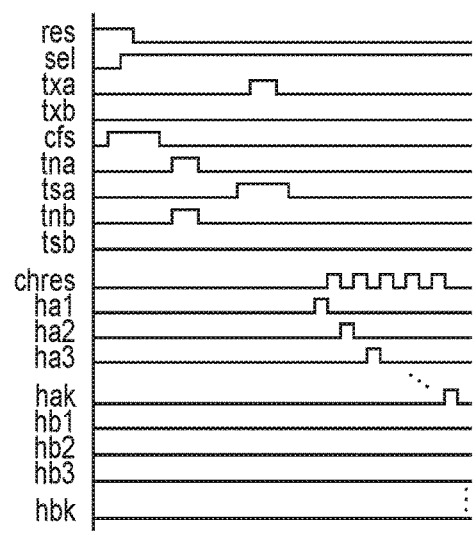
Figure 6C:
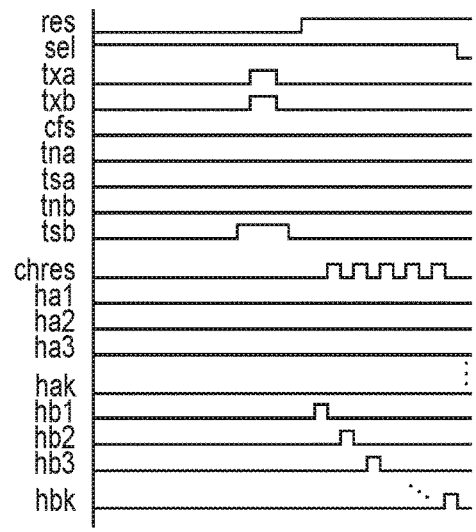

Subsequently, an operation of reading out each row of the regions R1 will be described with reference to FIGS. 6B and 6C. FIG. 6B is a timing chart of an operations for readout of the A image signals. The operation of first raising the signal cfs to the high level, lowering the signals tna and tnb to the low level, and storing N signals in the first N signal storage capacitor 610 and the second N signal storage capacitor 612 is similar to the operation described with reference to FIG. 6A.

When storing of the noise signals N ends, the transfer switch 605 is turned on by raising a signal tsa to the high level, and the transfer gate 502a is turned on by raising the signal txa to the high level. Signals accumulated in the PDs 501a of the subpixels a are output to the vertical output line 402 via the FD amplifier 504 and the pixel selection switch 506 by performing such an operation. Signals of the vertical output line 402 are amplified by the operational amplifier 603 using a gain that corresponds to the capacity ratio of the capacity C1 of the clamp capacitor 601 to the capacity C2 of the feedback capacitor 602, and are stored in the first S signal storage capacitor 609 via the transfer switch 605 (the pixel signal Sa).

Next, the horizontal transfer switches 405 and 406 are turned on due to an output ha1 of the horizontal scanning circuit 411 rising to the high level. Accordingly, signals of the first S signal storage capacitor 609 and the first N signal storage capacitor 610 are output to the output terminal 415 via the horizontal output lines 409 and 410 and the differential amplifier 414. The horizontal scanning circuit 411 outputs the signals of the subpixels a (the A image signals) for one row by sequentially raising selection signals ha1, ha2, . . . , hak for each column to the high level.

Readout of the A image signals ends while the signal res remains at the low level, and the signal sel remains at the high level. Accordingly, the A image signals on the FD portions 503 are held without being reset.

When readout of the A image signals ends, the procedure subsequently transitions to an operation of reading out the A+B image signals shown in FIG. 6C. The transfer switch 607 is turned on by raising the signal tsb to the high level, and the transfer gates 502a and 502b are turned on by raising the signals txa and txb to the high level. Due to such an operation, signals accumulated in the PDs 501b of the subpixels b are added to the signals of the subpixels a stored in the FD portion 503, and the added signals are output to the vertical output line 402 via the FD amplifier 504 and the pixel selection switch 506. The rest of the operation is the same as the operation regarding the region R2 described with reference to FIG. 6A.

In such a manner, an operation of reading out each row in the regions R1 ends. Accordingly, in the region R1, readout of the A image signals and readout of the A+B image signals are performed, and the A image signals and the A+B image signals are sequentially read out.

Shooting Operation

Next, an operation during image shooting performed by the image capturing apparatus 100 that has the above-described configuration will be described.

First, the optical system 1 uses a driving signal from the optical system driving unit 2 to drive the diaphragm and the lens, so as to form an object image whose brightness is set to be appropriate, on the light receiving surface of the image sensor 3. The image sensor 3 is driven by a drive pulse from the signal readout control unit 4, converts the object image into electrical signals by photoelectric conversion, and outputs the electrical signals as image signals.

Using a drive pulse that corresponds to distance information 5 from the focus detection unit 6, the signal readout control unit 4 reads out the A image signals and reads out the A+B image signals from the region R1, and reads out the A+B image signals from the region R2 by the above-described readout operation. The processing load is reduced by reading out the A image signals from a portion of the region in this manner. Furthermore, in the region R1 from which the A image signals have been read out, the AF control unit 8 acquires B image signals by subtracting the A image signals from the A+B image signals, and performs AF control using the A image signals and the B image signals. Note that AF control may be performed by individually reading out the A image signals and the B image signals from the region R1, and reading out the A+B image signals from the region R2 other than the region R1.

The focus detection unit 6 calculates object distance information (depth information) using the A image signals read out from a distance information acquisition region for AF control and a distance information acquisition region for object detection, which are controlled by the signal readout control unit 4, and the B image signals acquired by subtracting the A image signals from the A+B image signals. Note that in this embodiment, distance information is phase difference information (a defocus amount) for performing AF by (imaging plane) phase difference method.

Here, an overview of phase difference AF will be described. The focus detection unit 6 shifts a first focus detection signal acquired from the A image signal and a second focus detection signal acquired from the B image signal relatively in the pupil division direction, and calculates a correlation amount indicating a signal matching degree. Letting a k-th first focus detection signal be A(k), a k-th second focus detection signal be B(k), the range of the number k for the distance information acquisition region R1 be W, the shift amount due to shift processing be s, and the shift range of the shift amount s be τ, a correlation amount COR is calculated using the following expression.

$$\mathrm{COR}(s) = \sum_{k \in W} |A(k) - B(k-s)|, s \in \tau$$

Due to shift processing by the shift amount s, the k-th first focus detection signal A (k) and a (k-s)th second focus detection signal B (k-s) are associated with each other, and subtraction is performed to generate a shift subtraction signal, and the sum of the k signals is obtained within the range W corresponding to the distance information acquisition region so as to calculate the correlation amount COR (s). After that, the shift amount of a real value at which the correlation amount is a minimum value is calculated from the correlation amount by performing subpixel calculation, and is denoted by an image shift amount p. The image shift amount p is multiplied by the image height of the focus detection region, the F-number of the imaging lens (imaging optical system) and a first conversion coefficient K that corresponds to the exit pupil distance so as to detect the defocus amount.

Note that in this embodiment, an example is described in which the focus detection unit 6 calculates distance information (phase difference information) from A image signals and B image signals having different parallax (or viewpoints), but "information corresponding to depth" that is not converted into "distance" may be used as information for object detection, for example. The "information corresponding to depth" may be in any form of information regarding a "parallax amount (an image shift amount)" of A image signals and B image signals generated in the process of conversion into "distance", information regarding a "defocus amount", and information regarding "object distance", for example. In addition, in this embodiment, the "object distance" among the "information corresponding to depth" is acquired in a state of being dispersed over the entire screen, as information for object detection. Note that the "information corresponding to depth" for object detection may be recorded in association with the image.

The present invention can be applied to various embodiments as information corresponding to the depths of the objects in an image. Accordingly, it suffices for information (depth information) indicated by data corresponding to the depths of the objects to be information directly indicating the object distances in the image from the image capturing apparatus to the object or information indicating the relative relationship between the object distances and the depths of the object in the image.

Specifically, the image sensor 3 can output images formed as optical images by a pair of light beams that pass through different pupil regions of the optical system 1, as paired image signals, from a plurality of photoelectric conversion portions. An image shift amount of each region is calculated by correlation calculation between the paired image signals, and an image shift map indicating the distribution of the image shift amounts is calculated. Alternately, the image shift amount is further converted into a defocus amount, and a defocus map indicating defocus amount distribution (distribution on the two dimensional planes of the captured image) is generated. If this defocus amount is converted into an object distance based on the conditions of the optical system 1 or the image sensor 3, distance map data that indicates an object distance distribution is acquired.

As described above, in this embodiment, it suffices for the focus detection unit 6 to acquire image shift map data, defocus map data, or distance map data of object distances converted from a defocus amount. Note that data of each map data may be held in units of blocks, or in units of pixels. In this case, about eight bits as the number of bits are assigned in the smallest unit as in normal image data, and image processing, displaying, recording and the like may be performed using the data as distance image, similarly to image processing.

The AF control unit 8 performs AF by a phase difference method. The AF control unit 8 detects an in-focus position based on distance information (corresponding to an image shift amount or a defocus amount at which a correlation amount is smallest) from the focus detection unit 6, and outputs, to the optical system driving unit 2, optical system drive information for bringing the object into an in-focus state.

The signal processing unit 9 generates image data by converting image signals from the image sensor 3 into luminance signals and color difference signals, and outputs the image data to the recording unit 10 and the display unit 11. The recording unit 10 and the display unit 11 record and display the image data generated by the signal processing unit 9.

The recording unit 10 records luminance signals and color difference signals from the signal processing unit 9, distance information from the focus detection unit 6, and region information from the signal readout control unit 4 in association with each other as image information.

Next, the data configuration of image information and distance information (phase difference information) that are recorded in the recording unit 10 of this embodiment will be described with reference to FIG. 7.

Figure 7:
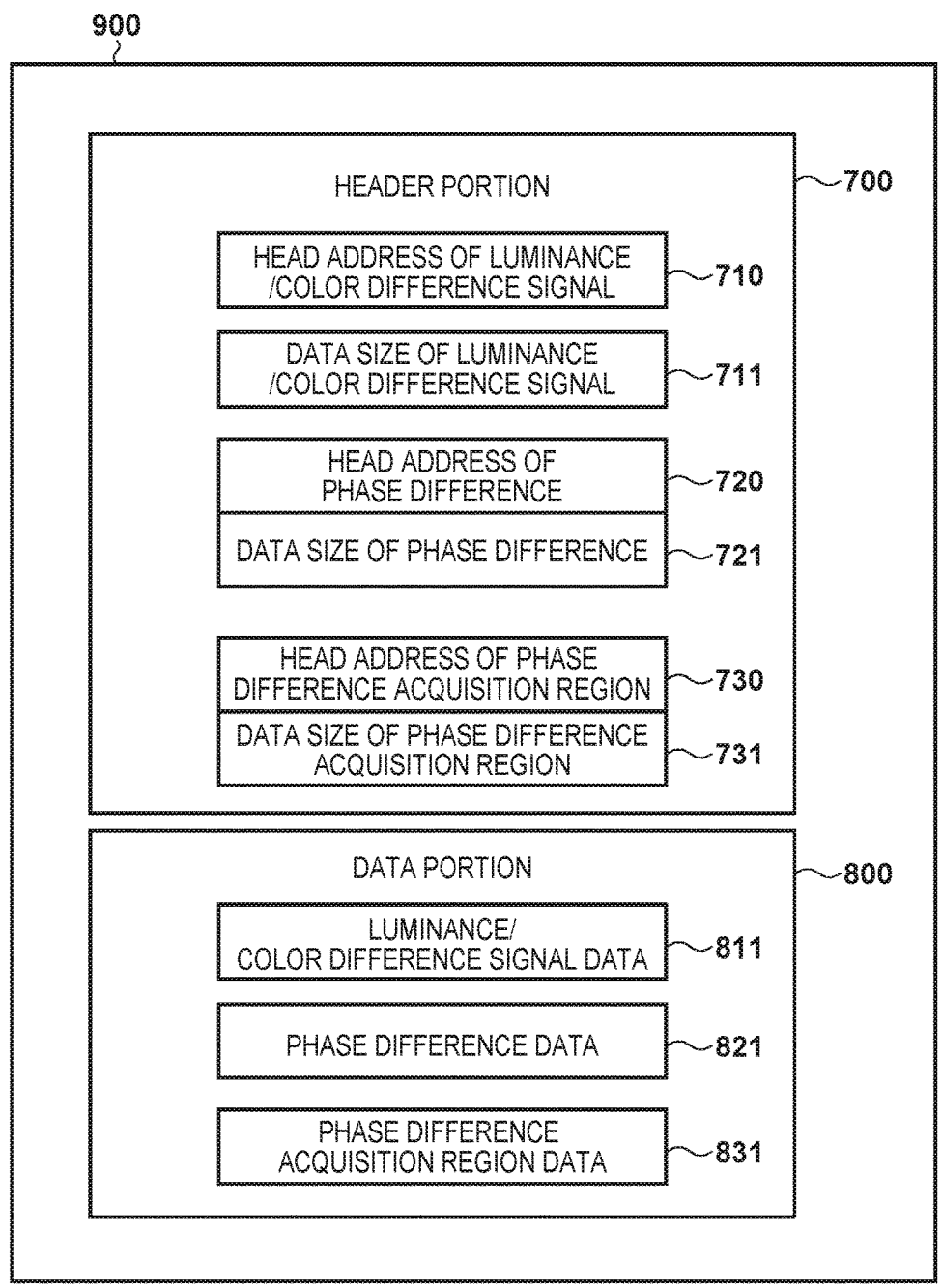
FIG. 7 is a diagram showing the data configuration of image information.
Figure 8:
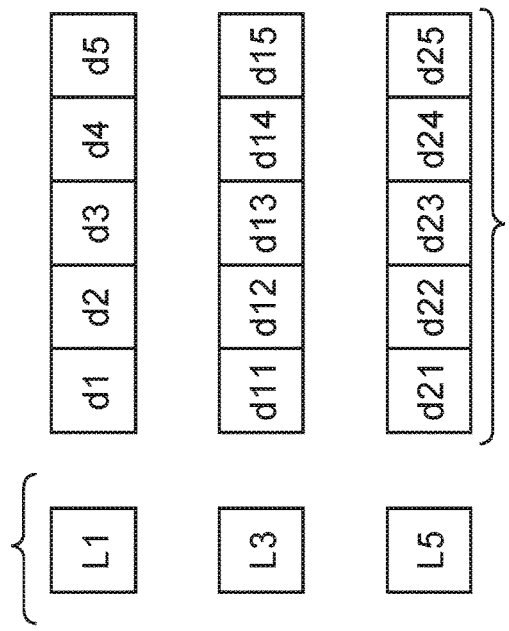
FIGS. 8A to 8D are concept diagrams for illustrating image information before phase difference interpolation.

In FIG. 7, reference numeral 900 denotes an example of image information. The image information 900 is constituted by a header portion 700 and a data portion 800. A head address 710 of a luminance/color difference signal, a data size 711 of the luminance/color difference signal, a head address 720 of distance information, a data size 721 of a phase difference, a head address 730 of a distance information acquisition region, and a data size 731 of distance information are recorded in the header portion 700. Luminance/color difference signal data 811, distance information data 821 and distance information acquisition region data 831 are recorded in the data portion 800.

As described above, the luminance/color difference signal, the distance information and the distance acquisition region data that are associated with each other can be read out by reading out the head address and the data size of the header portion 700 of the image information 900. Note that it suffices for the image information 900 to have a structure with which a luminance/color difference signal, distance information and a distance information acquisition region can be recorded and read out in association with each other, and the present invention is not limited to this configuration.

Distance Information Interpolation Processing

Next, phase difference interpolation processing performed by the distance information interpolation unit 14 of this embodiment will be described in detail with reference to FIGS. 8A to 10.

FIGS. 8A to 8D are concept diagrams of image information that is recorded in the recording unit 10 of this embodiment before distance information (hereinafter, a phase difference) is interpolated (five pixels horizontally and five pixels vertically). FIG. 8A shows luminance signals y1 to y25. FIG. 8B shows color difference signals u1, v2 to v24 and u25. FIG. 8C shows phase difference acquisition regions L1, L3 and L5 that are set such that discrete thinning is performed on the imaging screen, and the image signals from the pixels in the first row, the third row and the fifth row are pupil-divided image signals. Note that in this embodiment, description is given in which a phase difference acquisition region is set in the row (horizontal) direction, but the phase difference acquisition region may be set in the column (vertical) direction. FIG. 8D shows phase difference information d1 to d5, d11 to d15 and d21 to d25 acquired from the phase difference acquisition regions L1, L3 and L5. Note that y1, u1 and d1 indicate a signal at the same position, and y2, v2 and d2 indicate a signal at the same position, and the same applies to the remaining information.

Figure 9:
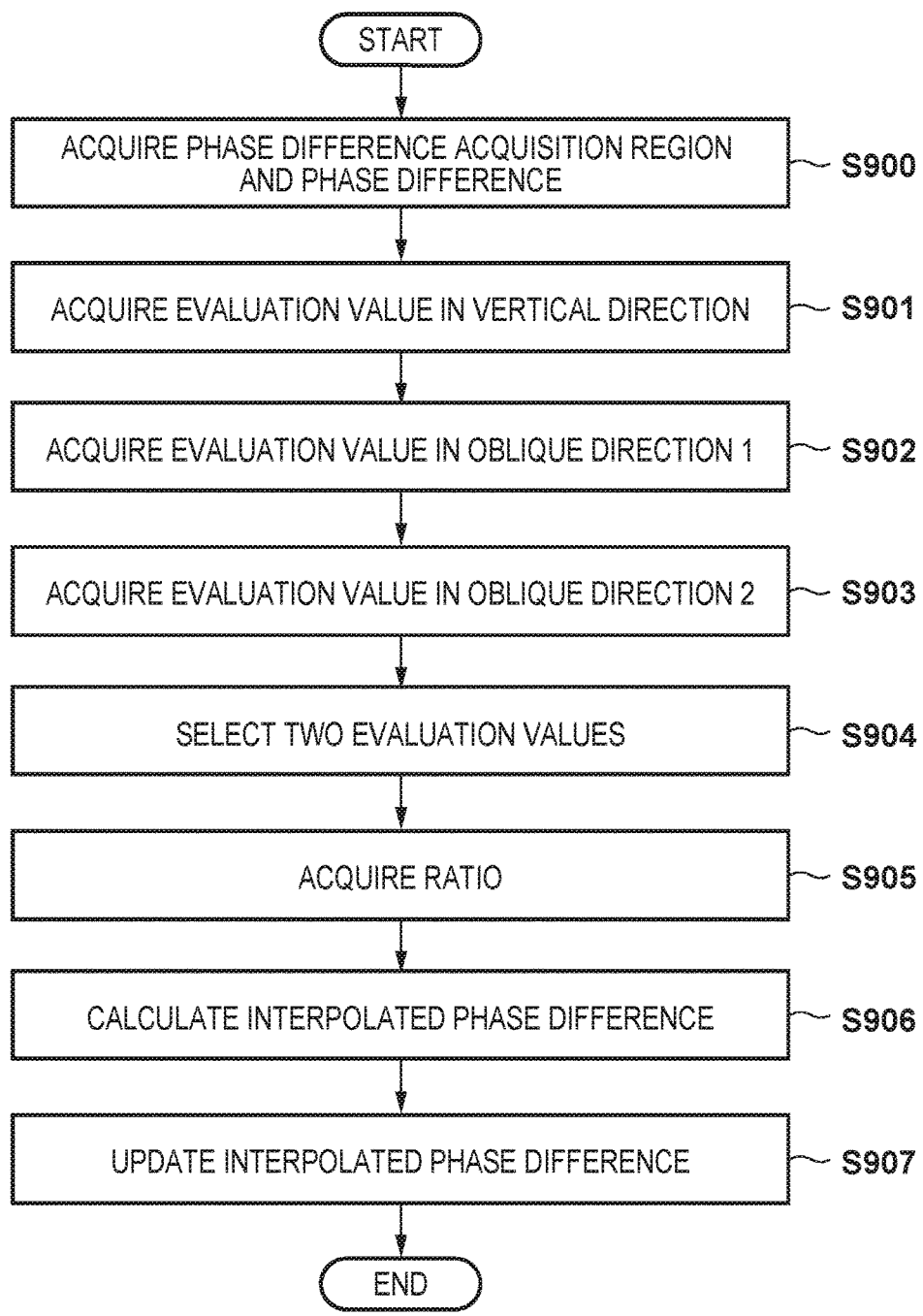
FIG. 9 is a flowchart showing phase difference interpolation processing of this embodiment.

FIG. 9 is a flowchart showing phase difference interpolation processing of this embodiment.

In step S900, the distance information interpolation unit 14 acquires a phase difference acquisition region L and phase difference information d from the recording unit 10.

In step S901, the distance information interpolation unit 14 acquires evaluation values V6 to V10 and V16 to V20 for the vertical direction in the phase difference acquisition region L. An evaluation value for the vertical direction is obtained as the absolute value of the difference between the phase differences of regions in the up-down direction, for example, using V7=|d2−d12| in the case of V7.

In step S902, the distance information interpolation unit 14 acquires evaluation values P6 to P10 and P16 to P20 for an oblique direction 1. An evaluation value for the oblique direction 1 is obtained as the absolute value of the difference between the phase differences of upper left and lower right regions, for example, using P7=|d1−d13| in the case of P7. Moreover, if a necessary phase difference cannot be acquired as in the case of P6, for example, the evaluation value P6 in the oblique direction 1 is infinite.

In step S903, the distance information interpolation unit 14 acquires evaluation values T6 to T10 and T16 to T20 for an oblique direction 2. An evaluation value for the oblique direction 2 is obtained as the absolute value of the difference between the phase differences of upper right and lower left regions, for example, using T7=|d3−d11| in the case of T7. Moreover, if a necessary phase difference cannot be acquired as in the case of T6, for example, the evaluation value T6 in the oblique direction 2 is infinite.

In step S904, the distance information interpolation unit 14 selects the two smaller evaluation values from three evaluation values at the same position (in the vertical direction, the oblique direction 1 and the oblique direction 2).

In step S905, the distance information interpolation unit 14 obtains ratios $\alpha 6$ to $\alpha 10$ and $\alpha 16$ to $\alpha 20$ based on the two evaluation values selected in step S904. For example, if the evaluation value V7 for the vertical direction and the evaluation value P7 for the oblique direction 1 were selected in step S904, the ratio $\alpha 7$ is obtained using Expression 1 below.

$$\alpha 7=(V7-P7)/(2\times Th)+0.5 \quad (1)$$

This ratio $\alpha 7$ being negative indicates that the ratio in the vertical direction is high, and the ratio $\alpha 7$ being positive indicates that the ratio in the oblique direction 1 is high. In addition, Th indicates a threshold for determining whether or not $\alpha 7$ satisfies $0 \leq \alpha \leq 1$ (the ratio in the vertical direction and the ratio in the oblique direction 1 are similar), and is set in a memory (not illustrated) in advance.

In step S906, the distance information interpolation unit 14 obtains phase differences Hd6 to Hd10 and Hd16 to Hd20 interpolated using any one of the following three methods according to the ratios $\alpha 6$ to $\alpha 10$ and $\alpha 16$ to $\alpha 20$. Here, the three interpolation methods will be described taking the example of the ratio $\alpha 7$.

1. Case of $0 \leq \alpha 7 \leq 1$

The ratios in the vertical direction and the oblique direction 1 are similar, and thus Expression 2 below is used to adaptively switch between the vertical direction and the oblique direction 1 according to the ratio $\alpha 7$. Specifically, the phase difference Hd7 is acquired by performing weighting.

$$Hd7=(\alpha 7(d1+d13)+(1-\alpha 7)(d2+d12))/2 \quad (2)$$

2. Case of $\alpha 7<0$

The ratio in the vertical direction is high, and thus the phase difference Hd7 is acquired from the vertical direction using Expression 3 below.

$$Hd7=(d2+d12)/2 \quad (3)$$

3. Case of $\alpha 7>1$

The ratio in the oblique direction 1 is high, and thus the phase difference Hd7 from the horizontal direction is acquired using Expression 4 below.

$$Hd7=(d1+d13)/2 \quad (4)$$

In step S907, the distance information interpolation unit 14 updates the image information in the recording unit 10 using the phase differences Hd6 to Hd10 and Hd16 to Hd20 acquired in step S906, and ends the processing. Here, the distance information interpolation unit 14 records the phase differences Hd6 to Hd10 and Hd16 to Hd20 acquired in step S906 in the recording unit 10 in association with position information of regions L2 and L4 other than the phase difference acquisition regions L1, L3 and L5.

FIG. 10 illustrates phase difference information after image information recorded in the recording unit 10 is updated (after phase difference interpolation). FIG. 10 shows a state in which the phase differences Hd6 to Hd10 and Hd16 to Hd20 of the regions L2 and L4 other than the phase difference acquisition regions L1, L3 and L5 have been interpolated and added to the discrete phase difference information d1 to d5, d11 to d15 and d21 to d25 before being interpolated in FIG. 8D.

As described above, according to this embodiment, it is possible to interpolate, using a phase difference acquisition region and phase difference information recorded in association with each other in the recording unit 10, the phase difference of a region in which phase difference information is not acquired and that is out of a phase difference acquisition region.

Note that in this embodiment, a phase difference acquisition region is set for every other row, but if a phase difference acquisition region is set for every multiple rows, interpolation can be similarly performed using known linear interpolation or adaptive interpolation. In addition, in this embodiment, a phase difference acquisition region is set for every other row, but phase difference acquisition regions may be set for all the rows, and thereby the phase differences of all the pixels can be acquired without interpolation.

Furthermore, a phase difference acquisition region may be selected according to optical system drive information of the AF control unit 8. Particularly, dynamic switching can be performed such that if the drive amount is minute (the main object is in focus), phase difference acquisition regions are set for all the rows, and phase difference information is acquired, and otherwise any suitable phase difference acquisition regions are set.

Moreover, in this embodiment, a case has been described in which distance information of a region that is outside of a phase difference acquisition region and in which phase difference information is not acquired is interpolated based on the phase difference acquisition region and the phase difference information, but it suffices to be able to acquire distance information of a region in which phase difference information is not acquired, and the present invention is not limited to this embodiment. For example, as described in Japanese Patent Laid-Open No. 2014-150521, the resolution of distance information can be improved by using a phase difference acquisition region, phase difference information and a luminance/color difference signal.

Second Embodiment

Next, a second embodiment will be described.

Figure 11:
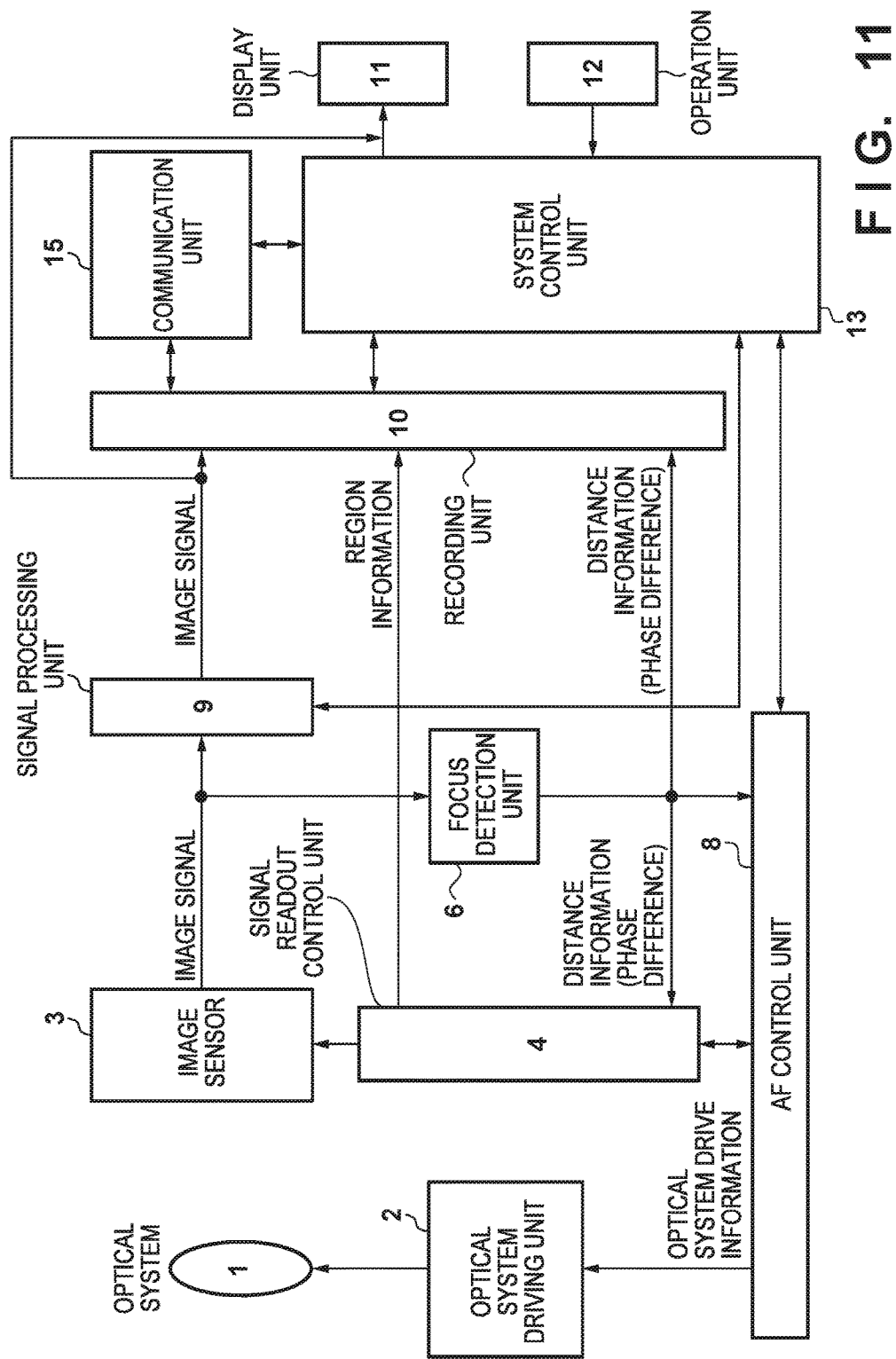
FIG. 11 is a block diagram showing the configuration of an image capturing apparatus of a second embodiment.

FIG. 11 shows the configuration of an image capturing apparatus 100 of the second embodiment. Note that in the second embodiment, the same reference numerals are assigned to constituent elements similar to those in the first embodiment, and description thereof is omitted.

The image capturing apparatus of the second embodiment has a communication unit 15 in place of the distance information interpolation unit 14. The communication unit 15 can perform transmission/reception of image signals and image information recorded in a recording unit 10 with an external apparatus using wired communication or wireless communication. First, the communication unit 15 transmits image information including phase differences before being interpolated to the external apparatus. The external apparatus that has received the image information including phase differences before being interpolated performs the above-described phase difference interpolation processing, and transmits image information including the interpolated phase differences to the image capturing apparatus 100. Upon receiving the image information via the communication unit 15, the image capturing apparatus 100 records, in the recording unit 10, the image information including the interpolated phase difference.

By configuring the image capturing apparatus 100 to be communicable with an external apparatus in this manner, it is possible to cause the external apparatus to execute phase difference interpolation processing, and thus the distance information interpolation unit 14 is not necessary, making it possible to reduce usage of storage capacity by the image capturing apparatus 100.

Third Embodiment

Next, a third embodiment will be described.

Figure 12:
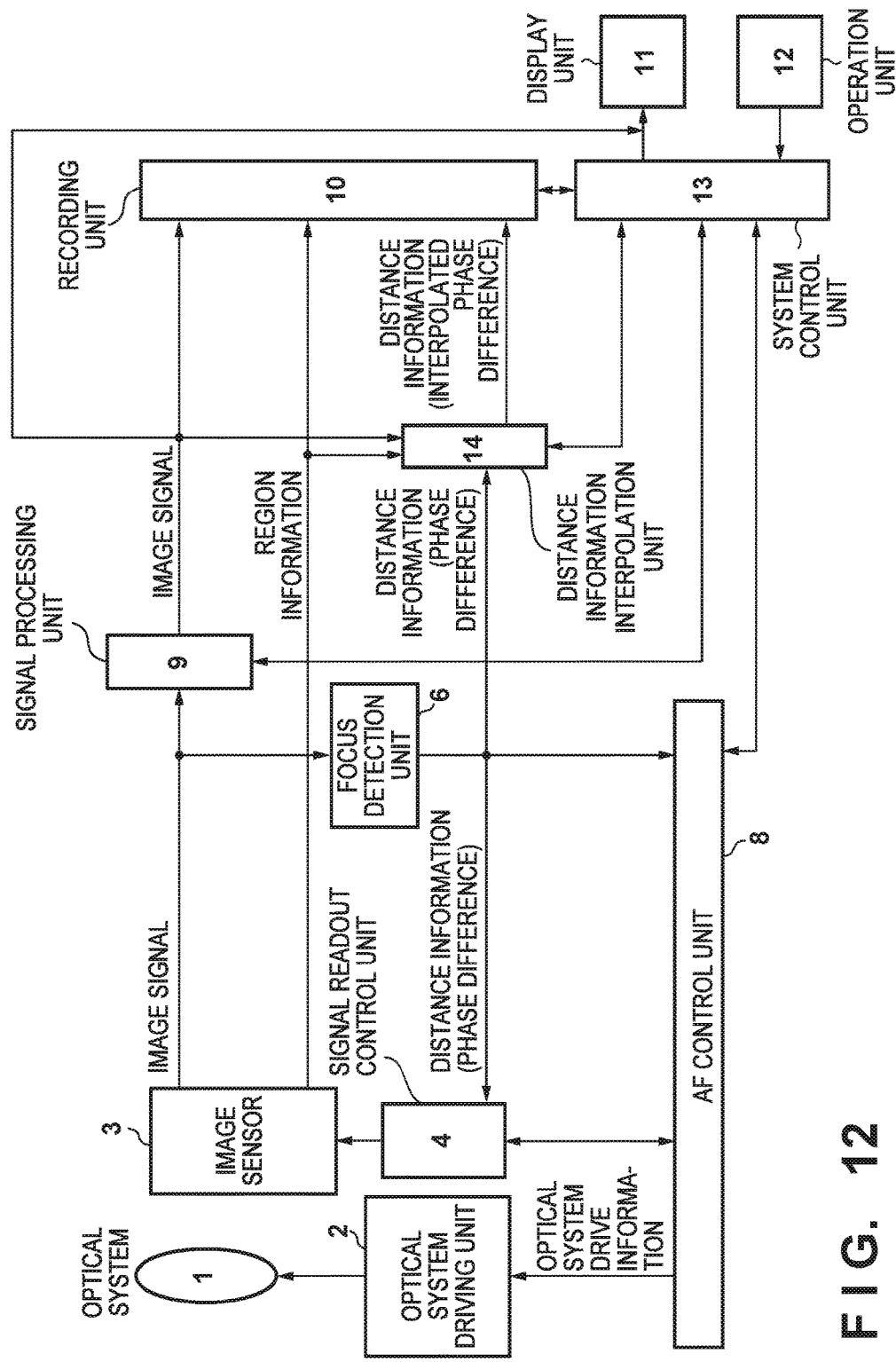
FIG. 12 is a block diagram showing the configuration of an image capturing apparatus of a third embodiment.

FIG. 12 shows the configuration of an image capturing apparatus 100 of the third embodiment. Note that in the third embodiment, the same reference numerals are assigned to constituent elements similar to those in the first embodiment, and description thereof is omitted.

In the image capturing apparatus of the third embodiment, the distance information interpolation unit 14 acquires image signals processed by the signal processing unit 9, a phase difference acquisition region from the signal readout control unit 4, and phase difference information from the focus detection unit 6, and interpolates, based on these pieces of information, distance information of a region that is outside of the phase difference acquisition region and in which phase difference information is not acquired. The distance information interpolation unit 14 outputs interpolated phase differences to the recording unit 10, and the recording unit 10 records the image signals processed by the signal processing unit 9, the phase difference acquisition region from the signal readout control unit 4, and the phase difference information acquired by the distance information interpolation unit 14 in association with each other as image information.

With such a configuration, image information for phase difference interpolation processing does not need to be read out or to be written, thus enabling a reduction in the processing time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-086575, filed Apr. 22, 2016 which is hereby incorporated by reference herein in its entirety.

What is claimed is:

1. An image capturing apparatus comprising:
    an image sensor;
    a readout circuit configured to read out an image signal from pixels of the image sensor;
    a readout controller configured to control a region in which at least one group of a plurality of image signals having different viewpoints is read out from pixels of the image sensor by the readout circuit;
    an information acquirer configured to acquire depth information using the image signals read out from the region by the readout circuit;
    a recording medium configured to record image information in which the image signals, the depth information and information regarding the region are associated with each other; and
    an interpolator configured to obtain depth information at the same position in a second region that is outside of the region, and in which the image signals are not acquired, by interpolating depth information recorded in the recording medium.

2. The apparatus according to claim 1, wherein the depth information is distance information of an object acquired by performing correlation calculation on a plurality of image signals having the different viewpoints, and
    the interpolator interpolates the distance information using linear interpolation.

3. The apparatus according to claim 2, wherein the interpolator obtains a difference between pixels in a vertical direction in distance information of a region in which the image signals are read out, and a difference between pixels in an oblique direction in the distance information of the region in which the image signals are read out, and adaptively interpolates the distance information based on the differences.

4. The apparatus according to claim 2, wherein the depth information is information regarding phase differences of the image signals.

5. The apparatus according to claim 1, wherein the interpolator interpolates the depth information by raising a resolution of the image signals.

6. The apparatus according to claim 1, further comprising:
a focus adjuster configured to determine a focus state of an object based on the depth information acquired by the information acquirer, and perform focus adjustment so as to bring the object into an in-focus state,
wherein the readout controller controls the region based on drive information for driving an optical system using the focus adjuster.

7. The apparatus according to claim 6, wherein
the readout controller sets an entire screen as the region if the drive information is minute.

8. The apparatus according to claim 1, further comprising:
a communication transceiver configured to communicate with an external apparatus,
wherein the communication transceiver transmits image information recorded in the recording medium to the external apparatus, and receives image information obtained by the external apparatus.

9. The apparatus according to claim 1, wherein the interpolator obtains the depth information at the same position in the second region that is outside of the region, and in which the image signals are not acquired, based on the image signal read out by the readout circuit, information regarding the region acquired by the readout controller, and the depth information acquired by the information acquirer, and
the depth information acquired by the interpolator is recorded in the recording medium in association with the image signal and position information of the second region outside of the region.

10. The apparatus according to claim 1, wherein in the image sensor, a plurality of photoelectric conversion portions are assigned to one microlens.

11. The apparatus according to claim 1, wherein the readout controller determines a region according to a processing load required for the readout circuit to read out image signals.

12. The apparatus according to claim 1, wherein the information regarding the region is information regarding a depth information acquisition region when reading out image signals from the image sensor.

13. A control method of an image capturing apparatus which has an image sensor, a readout circuit configured to read out an image signal from pixels of the image sensor, and a readout controller configured to control a region in which at least one group of a plurality of image signals having different viewpoints is read out from pixels of the image sensor by the readout circuit, the method comprising:
acquiring depth information using the image signals read out from the region by the readout circuit;
recording image information in which the image signals, the depth information and information regarding the region are associated with each other; and
obtaining depth information at the same position in a second region that is outside of the region, and in which the image signals are not acquired, by interpolating depth information recorded in the recording step.

14. A computer-readable storage medium storing a program for causing a computer to execute a control method of an image capturing apparatus which has an image sensor, a readout circuit configured to read out an image signal from pixels of the image sensor, and a readout control unit configured to control a region in which at least one group of a plurality of image signals having different viewpoints is read out from pixels of the image sensor by the readout circuit, the method comprising:
acquiring depth information using the image signals read out from the region by the readout circuit;
recording image information in which the image signals, the depth information and information regarding the region are associated with each other; and
obtaining depth information at the same position in a second region that is outside of the region, and in which the image signals are not acquired, by interpolating depth information recorded in the recording step.

* * * * *